United States Patent Office 3,343,959
Patented Sept. 26, 1967

3,343,959

PHOTOPOLYMERIZABLE COATED LAYERS USING ORGANIC SALTS OF MANGANIC IONS AND METHOD OF PRODUCTION

Edward Cerwonka, Binghamton, N.Y., assignor to General Aniline & Film Corporation, New York, N.Y., a corporation of Delaware No Drawing. Filed Dec. 30, 1963, Ser. No. 334,571
18 Claims. (Cl. 96—33)

ABSTRACT OF THE DISCLOSURE

Dark-stable photopolymerizable coatings are prepared by mixing aqueous solutions of an alkali metal manganic pyrophosphate and of an alkali metal salt of an aliphatic organic acid capable of splitting of the carbon dioxide radical on exposure to light, such as sodium or potassium oxalate monohydrate, with a polymerizable ethylenically unsaturated monomer, such as N,N'-methylenebisacrylamide, in a nitrogen containing polymeric binder, free of hydroxyl groups, for example, polyvinyl pyrrolidone.

The present invention relates to an improvement in photopolymerizable coated layers using as the catalyst organic salts of manganic ions and to a process of preparing the same. More specifically, the invention relates to a system involving manganic ions, in cooperation with certain organic anions, as a means of causing photopolymerization of ethylenically unsaturated compounds containing a $CH_2=C<$ group which is present in a photosensitive coating composition.

It is known that trivalent ions of manganese have the ability to initiate polymerization of certain unsaturated monomers such as, for example, vinyl monomers. Drummond and Waters in "Journal of the Chemical Society" (1953) at page 2836 described such a system. It is also known that the polymerization of vinyl monomers, in suitable situations takes place in the presence of certain organic anions. Perhaps the most effective of these organic agents is the oxalate anion. The glycollic ion is also quite satisfactory. Apparently, the following reaction takes place:

$$Mn^{+3}+C_2O_4^{=}\rightarrow Mn^{+2}+CO_2+\cdot CO_2^{-}$$

It is believed that the carbon dioxide radical ion is responsible for initiating the polymerization that takes place. See, for example, Gilman, "Organic Chemistry," vol. IV (John Wiley and Son 1953) page 1214.

The prior art also has suggested systems suitable for the preparation of light-sensitive compositions which contain manganic oxalate. Such a system is described by Eder in "Phototype, Platinotype, and Other Copy Processes Without Silver," published by Halle (1929), page 169. Such compositions, however, have not included vinyl monomers.

It is, of course, desirable to be able to prepare photographic coatings which do not use the relatively expensive silver salts which are commonly and almost universally employed for photographic sensitization. An object of the present invention is to prepare non-silver containing photopolymerizable coatings, and compositions suitable therefore, which are essentially stable in the dark and which, at the same time, retain a high degree of sensitivity to light over a period of months. Such materials, of course, are essential for use in photographic sheets and other supplies which are to be stored for a time and subsequently marketed or used.

According to the present invention, it has been found possible to prepare photopolymerizable coatings containing ethylenically unsaturated monomers, which are essentially dark stable and which also retain the same, or virtually the same, degree of sensitivity to light even after extended storage under dark conditions over time periods of many months.

According to one embodiment of the present invention, a suitable aqueous solution of an alkali metal manganic pyrophosphate, which is not light sensitive, per se, is first prepared. Various methods may be used to prepare this material. Directions for preparing satisfactory compositions are given by Drummond and Waters in "Journal of Chemical Society" (1953) at page 442. Briefly, manganous sulfate is added to an aqueous solution of sodium pyrophosphate and the resulting solution is brought to a slightly acidic pH by addition of a suitable inorganic acid. More specifically, 5.0 milliliters of an aqueous solution, containing 114 grams of the manganous sulfate tetrahydrate per liter, are added to the aqueous sodium pyrophosphate. 110 milliliters of an aqueous solution of the sodium pyrophosphate containing 70 grams of the $Na_4P_2O_7\cdot 10H_2O$ per liter should be employed in this particular case. The resulting solution of sodium manganic pyrophosphate is brought to a pH of 6.0 by addition of 5 milliliters of 4 N sulfuric acid.

The solution, as thus prepared, is next titrated electrochemically with potassium permanganate to obtain the $Mn^{+3}$ ion. In the solution just described, 2.5 milliliters of potassium permanganate from an aqueous solution containing 39.508 grams per liter is added. The resulting reaction between the manganous sulfate and the permanganate involves oxidation of the manganous ions to manganic. This, of course, is accompanied by the simultaneous reduction of the permanganate to the manganic ion. This conversion goes to substantial completion.

The reaction apparently proceeds as follows:

$$4MnSO_4+KMnO_4+4H_2SO_4+5Na_4P_2O_7\rightarrow$$
$$\rightarrow 5NaMnP_2O_7+7Na_2SO_4+NaKSO_4+4H_2O$$

The present invention involves the use of a composition of $Mn^{+3}$ ions, e.g., from a source composition prepared as above, along with other suitable components to obtain the photopolymerizable effect. It is necessary to use a macro-molecular binder of suitable type in the coating composition. For this purpose, synthetic nitrogen-containing vinyl polymers exemplified by polyvinyl pyrrolidone or polyacrylamide are particularly satisfactory.

Examples of such nitrogen-containing polymers are poly-N-vinyl-2-pyrrolidone, poly-N-vinyl-2-piperidone, poly-N-vinyl-2-caprolactam, polyacrylamide, polymethacrylamide; copolymers of poly-N-vinyl-2-pyrrolidone and vinyl chloride and the like. The quantity of the binders will be sufficient to insure that a satisfactory coating of the ingredients will be laid down and in general will range from about 10 to 30 parts by weight per part by weight of the manganic salt.

The chemical structure of the binder appears to be quite important. Cellulose derivatives or gelatins, such as those commonly used in photographic solutions, have not been used successfully in the process of this invention. Apparently, carbinol or hydroxyl groups present in the binder cause a dark reaction. Hence, the binder material, as far as can now be ascertained, must be substantially free of such groups.

In addition, the pH of the composition appears to have an important effect on the stability of the solution, particularly of manganic oxalate. Hence it is not feasible to employ oxalic acid instead of the alkali metal oxalate. Attempts to employ oxalic acid were unsuccessful, evidently because the acid causes destruction of the photochemical properties of the coating composition.

Moreover, the coated layer slowly polymerizes in the dark when acid is used.

In addition, the quantities of the oxalate salt to be employed to react with the manganic material must be carefully chosen. Excessive quantities of oxalate salts are found to reduce the photosensitivity of the preparation. Generally, the salt will range from .5 to 3 parts by weight per 1 part of the manganic salt.

Other compositions which produce carbon dioxide radicals or anions may be substituted for the oxalate, although the oxalate is superior to most of them. For example, sodium or potassium glycollate, lactate or tartronate may be substituted for sodium or potassium oxalate in compositions made according to the process of the present invention. However, many salts of related organic acids are not at all effective during exposures of less than three minutes, when employing a usual or conventional light source.

As to the ethylenically unsaturated monomer, which is to be polymerized in the reaction, various materials may be employed which will be catalyzed to polymerization by actinic exposure and in the presence of the manganic ion. For this purpose there may be used acrylamide, acrylonitrile, vinylmethylether, vinylethylether, vinylbutylether, methacrylamide, N,N'-methylenbisacrylamide, N,N'-m-hydroxy-benzalbisacrylamide, N,N'-benzalbisacrylamide and the like. The quantities of the monomer may range from about .5 to 5 percent by weight of the manganic salt. A preferable monomer, and one which in practice is found to be very satisfactory is N,N'-methylenebisacrylamide.

The sodium pyrophosphate, prepared as described above, when in the presence of the appropriate organic salt for producing the $CO_2$ ion, reacts very satisfactorily to give the desired result. A particularly suitable combination is one involving the use of sodium or potassium oxalate monohydrate solution with sodium manganic pyrophosphate in the polymer- and vinyl monomer-containing coating composition.

The invention will be more fully understood by reference to specific examples.

EXAMPLE I

A solution of sodium manganic pyrophosphate was prepared from manganous sulfate and sodium pyrophosphate by combining the ingredients and adjusting the pH with sulfuric acid in the manner described above. Using this material as the first element of a sensitizing material, a formulation was prepared of the following ingredients:

| | | |
|---|---|---|
| Sodium manganic pyrophosphate solution (prepared as above) | milliliters | 10.0 |
| Potassium oxalate monohydrate solution (25 g./100 ml. aq.) | do | 5.0 |
| N,N'-methylenebisacrylamide (recrystallized twice from water) | grams | 2.0 |
| Polyvinyl pyrrolidone | do | 15.0 |
| Water, to make | milliliters | 50.0 |

After mixing the other ingredients, the oxalate was added in red light. The coating composition thus prepared was coated onto baryta paper, also in red light, and then allowed to dry. A sample of the coated paper, after drying, was next exposed to a negative by the light from a 375 watt reflector lamp at a distance of 16 inches for a period of 30 seconds. After exposure, the sheet was given a warm water wash. As a result, it produced an excellent resist, suitable for offset lithographic printing purposes.

Another sample of the coated sheet was stored in the dark at room temperature for six weeks to determine the effect of such storage over an extended time period on the sensitivity of the coating. After exposure and treatment in the same manner as described above in connection with the first sample, a good photographic image resulted. These was no evidence of any visible degree of polymerization during the storage in the dark.

EXAMPLE II

The above example was repeated except that sodium glycollate was substituted for the potassium oxalate. Essentially the same results ensued. In general terms, the sodium and potassium oxalates and glycollates are interchangeable.

The invention has several important general aspects that should be mentioned. By the use of organic salts combined with the manganic ion, the photosensitive species can readily be isolated from other valence states of the manganese metal. These other states, of course, are ineffective for purposes of this invention. In addition, the photopolymerizable mixture has a pH which apparently must be kept slightly on the acid side, around 5.0 to 6.0, by reason of the oxalate or the glycollate salt used. As noted above, acid should not be used. Hence the pH factor is not strongly acidic and it does not appear to affect stability adversely during storage for extended time periods in darkness.

As a further aspect, by excluding carbinol or hydroxyl groups in the binder, the decomposition or premature polymerization of the ethylenically unsaturated monomer in the dark is readily prevented. The reason for this, apparently, is that the $CO_2$ radical does not become effective to initiate formation of the polymer during storage in darkness.

It will be obvious that various modifications, in addition to those mentioned above, may be made in the composition and in the method of preparing the coated sheet materials of this invention without departure from the spirit and purpose of this invention. It is intended by the claims which follow to cover such, as far as the prior art properly permits.

What is claimed is:

1. A light-sensitive photographic element comprising a base coated with a light-sensitive material containing an alkali metal manganic pyrophosphate capable of releasing a manganic ion, an alkali metal salt of an organic acid selected from the class consisting of oxalic acid, glycollic acid, lactic acid and tartronic acid, an ethylenically unsaturated monomer containing a $CH_2{=}C<$ group and a nitrogen-containing polymer free from hydroxyl and carbinol groups.

2. A light-sensitive photographic element comprising a coating of sodium manganic pyrophosphate, potassium oxalate, a di-substituted methylenebisacrylamide and polyvinyl pyrrolidone.

3. An article according to claim 1 wherein the monomer is N,N'-methylenebisacrylamide.

4. The process of preparing a printing plate suitable for offset lithography which comprises coating a base with a coating composition comprising an alkali metal manganic pyrophosphate, an alkali metal salt of an organic acid selected from the class consisting of oxalic acid, glycollic acid, lactic acid and tartronic acid, a polymerizable ethylenically unsaturated monomer and a nitrogen-containing polymeric binder material free of hydroxyl and carbinol groups irradiating said coating to white light under a pattern and washing away unexposed areas.

5. A process according to claim 4 wherein the manganic pyrophosphate is a sodium salt and the organic salt is a potassium salt.

6. A process according to claim 4 wherein the monomer is N,N'-methylenebisacrylamide.

7. A process according to claim 4 wherein the binder is polyvinyl pyrrolidone or polyacrylamide.

8. A process according to claim 4 wherein the organic salt is an alkali metal oxalate.

9. A process according to claim 4 wherein the organic salt is an alkali metal glycollate.

10. A process according to claim 4 wherein the organic salt is an alkali metal lactate.

11. A process according to claim 4 wherein the organic salt is an alkali metal tartronate.

12. An article according to claim 1 wherein the organic salt is an alkali metal oxalate.

13. An article according to claim 1 wherein the organic salt is an alkali metal glycollate.

14. An article according to claim 1 wherein the organic salt is an alkali metal lactate.

15. An article according to claim 1 wherein the organic salt is an alkali metal tartronate.

16. An article according to claim 1 wherein the amount of nitrogen-containing polymer in said light sensitive material ranges from about 10 to 30 parts by weight per part of manganic salt.

17. An article according to claim 1 wherein the amount of alkali metal salt of the organic acid in said light sensitive material ranges from .5 to 3 parts by weight per part of the manganic salt.

18. An article according to claim 1 wherein the pH of said light sensitive material is from about 5.0 to 6.0.

References Cited

UNITED STATES PATENTS 3,118,767 1/1964 Evans ............... 96—115

OTHER REFERENCES

Levinos, AD–267, 415, "Investigation of the Photopolymerization Process," Final Report, June 15–Aug. 31, 1961, pp. 3, 4, Rec'd Astia Dec. 11, 1961 Cerwonka, AD–277, 673 "Investigation of the Photopolymerization Process," Second Quarterly Report, Feb 15–May 14, 1962, pp. 10–13, Rec'd Astia July 13, 1962.

NORMAN G. TORCHIN, *Primary Examiner.*

R. H. SMITH, *Assistant Examiner.*